Oct. 27, 1964 A. X. WIDMER ETAL 3,154,697

DATA TRANSMITTING APPARATUS EMPLOYING SWITCHES AND DIODES TO SELECTIVELY TRANSMIT PULSES OF DESIRED POLARITY

Filed Dec. 31, 1962 2 Sheets-Sheet 1

INVENTORS
ALBERT X. WIDMER
PAUL ABRAMSON

BY Robert E. Sandt

AGENT

United States Patent Office 3,154,697
Patented Oct. 27, 1964

3,154,697

DATA TRANSMITTING APPARATUS EMPLOYING SWITCHES AND DIODES TO SELECTIVELY TRANSMIT PULSES OF DESIRED POLARITY

Albert X. Widmer, Peekskill, and Paul Abramson, Yorktown Heights, N.Y., assignors to International Business Machines Corporation, New York, N.Y., a corporation of New York Filed Dec. 31, 1962, Ser. No. 248,703
6 Claims. (Cl. 307—88.5)

Figure 1:
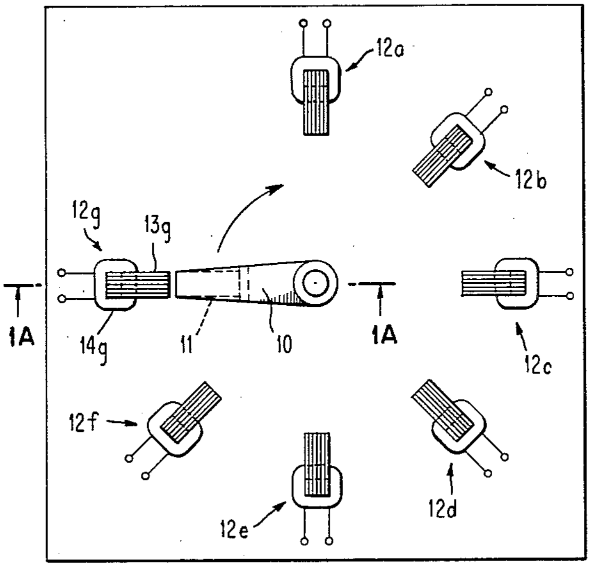

This invention relates to electrical communication systems, and more particularly to an improved transmitting apparatus for transmitting bi-polar signals on a transmission line.

With the advent of centralized computer control of manufacturing and other operations, the application for remote terminals capable of reporting binary conditions has materially expanded. Since one computer may service a great many of terminal installations, the total cost of the installation is materially affected by the unit cost of the terminals themselves as well as the cost of the wiring necessary to connect the terminals to the central office. Because the conditions upon which the terminals are reporting do not change rapidly, nor do they require monitoring within extremely short time periods, the data transmission rate may be somewhat slower, particularly if an over-all cost advantage can be achieved.

It is, therefore, an object of this invention to provide a low cost binary data transmitter.

A further object is to provide a low cost data transmitter capable of selectively transmitting the positive and negative polarity pulses from a plurality of sequentially operative bi-polar signal sources on a common transmission line.

Another object is to provide an improved pulse combining circuit for a data transmitter, which circuit requires no source of power other than the signal source.

Yet another object of this invention is to provide a novel transmitting apparatus in which a plurality of sequentially operating bi-polar signal sources are connected with unidirectional current conducting devices so as to separate the bi-polar pulses into their positive and negative components and selectively switched to provide the sequential datum significance and recombined for sequential transmission on a common transmission line with no power other than the power supplied from the signal source.

A final and specific object is to provide a novel data transmitting apparatus in accordance with the foregoing objects in which a plurality of sequentially operating bi-polar signal sources each has connected thereto a forward and a reverse conducting unidirectional current conducting device, the forward unidirectional current conducting devices being commonly connected each through a selectively actuable switch to a semiconductor device of a first conductivity type and the reverse conducting unidirectional current conducting devices being commonly connected each through a selectively actuable switch to a semiconducting device of a conductivity type opposite to that of said first conductivity type, and semiconducting devices being so interconnected to the first of a pair of transmission lines and to a common return line such that the respective conduction induced in each of the semiconductor devices by the respective positive and negative pulses will reversely bias the other semiconductor device against conduction to isolate the inactive pulse sources form the circuit.

The foregoing and other objects, features and advantages of the invention will be apparent from the following more particular description of preferred embodiments of the invention, as illustrated in the accompanying drawings.

Figure 1A:
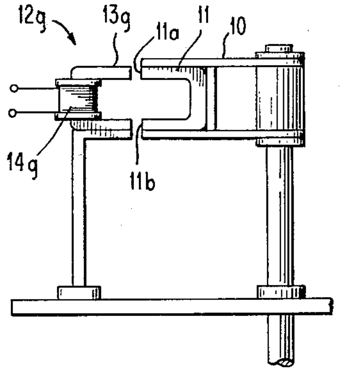

In FIG. 1 and FIG. 1A the preferred construction for the pulse generator is shown. Although other forms of bi-polar signal generators can obviously be devised, the arrangement illustrated not only provides the requisite inexpensive structure, but it also produces a signal of sufficient strength to drive the pulse processing circuits and the communication line without any power from additional sources. Except for a synchronous motor connected to a local power outlet supplying commercial regulated power, no additional external power nor internal power supplies are required.

In the illustration the arm 10 is rotated at a constant angular velocity by a synchronous motor (not shown). Affixed to the end of the arm is a semi-rectangular permannent magnet 11 having pole pieces 11*a* and 11*b*. A series of magnetic transducers 12*a* through 12*g* having the respective cores 13*a* through 13*g*, and signal windings 14*a* through 14*g* are disposed along the circumference of the circle swept by the magnet 11 in its rotation upon the arm 10. The pole pieces 11*a* and 11*b* will sweep in close proximity to the complementary pole pieces of each of the transducers 12*a* through 12*g* in succession to induce in the respective signal windings thereof a bi-polar signal, as the magnet approaches and recedes from each of the transducers in turn. Whether the positive or negative portion of the signal comes first is a mere matter of the relativity of the permanent magnet poles to the connections to the signal windings. The transducers, of which seven are shown, are disposed at 45° angles about the circumference of the circle with the eighth transducer omitted. The enlarged gap between two transducers provides an index reference, such that the receiver may attach the proper hierarchical significance to the succession of signals. Obviously, any greater or lesser number of transducers may be employed compatible with the physical space available for their mounting without interference, and the frequency response characteristics of the communication line. A practical and easily fabricated terminal for reporting the operating status of machines on a production floor would, for example, employ twenty-five transducers and a rotational speed of the arm 10 of 1800 r.p.m. An apparatus of this configuration is well within the frequency response of a standard telephone line.

Figure 2:
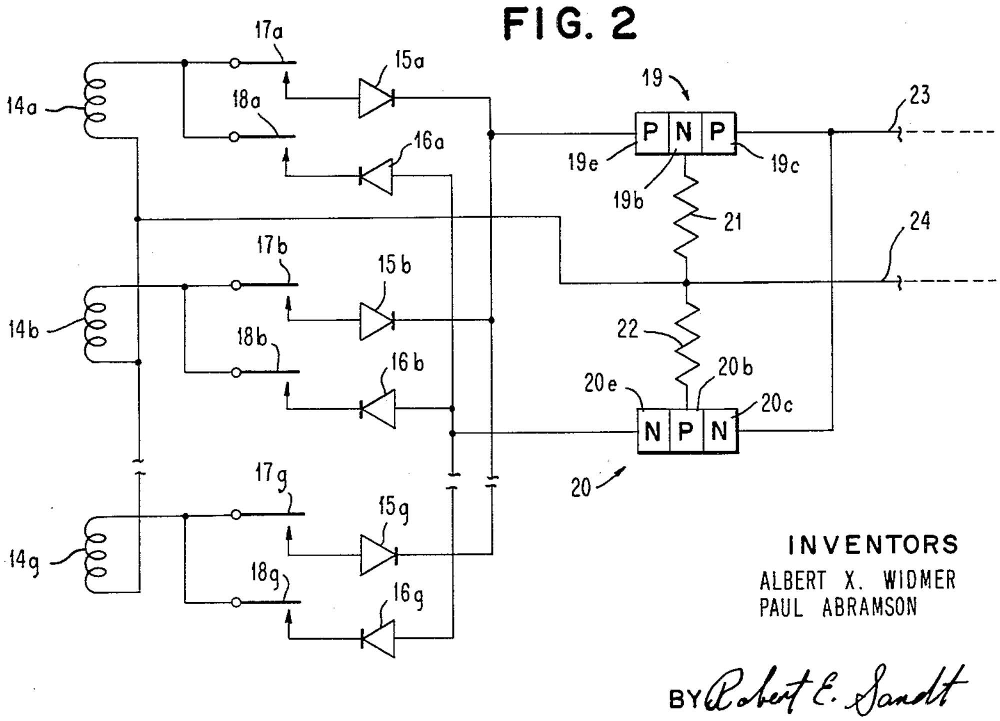
Figure 3:
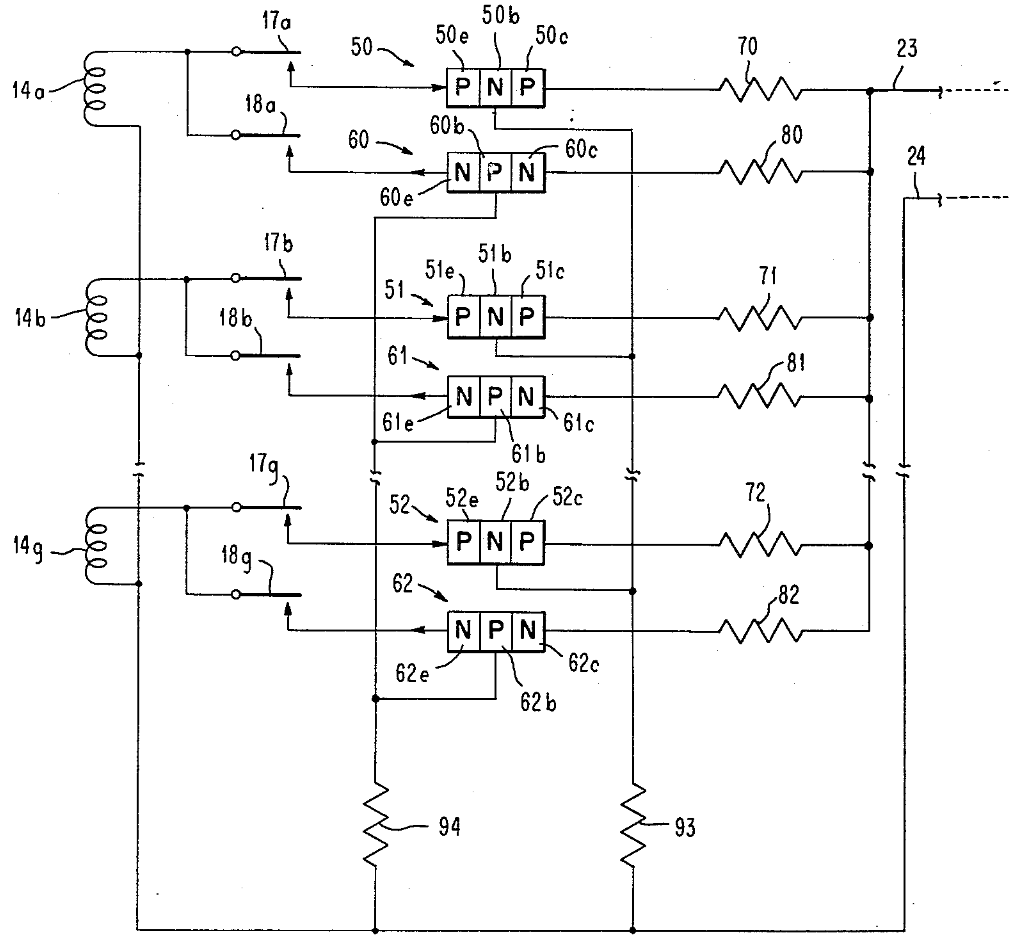

Whatever form the signal generator may assume and however many separate sequentially operating bi-polar signal sources are available, the circuits shown in FIGS. 2 and 3 separate the positive and negative loops of the bi-polar signals in separate channels for separate switch control to give data significance to the original signals, and then recombine the positive and negative loops on a common line for transmission to the receiver.

In the circuit of FIG. 2 the transducers 12*a* through 12*g* (FIG. 1) and their respective signal windings 14*a* through 14*g* have been further reduced in number so as not to confuse the showing with undue multiplicity of elements. The drawing break is intended to show that transducers in excess of the number illustrated may be introduced within the broken portion of the drawing by simple extrapolation of the circuits illustrated.

Each of the signal windings 14 in FIG. 2 has a diode 15*a*, 15*b*, and 15*g* connected to the respective coils for conduction away from the coils, and a diode 16*a*, 16*b*, 16*g* connected respectviely to the same coil terminals for conduction toward the coils. The remaining terminals of the coils 14 are commonly connected to the remaining line 24 of the transmission line pair. Each circuit leg thus created by the diodes 15 and 16 has serially connected therein a switch 17 and 18, the lettered suffixes equating the switches to the respective circuits. All of the positive circuit legs from the terminals of the switches 17*a*, 17*b*· 17*g* are commonly connected to the emitter terminal 19*e* of a PNP conductivity-type transistor 19. The negative circuit legs from the terminals of the switches 18*a*, 18*b*, and 18*g* are similarly commonly connected to the emitter terminal 20*e* of an NPN conductivity-type transistor 20. The base 19*b* of transistor 19 is returned to the common line 24 through a resistor 21, as is the base 20*b* returned to the same line through the resistor 22. Both the collectors 19*c* and 20*c* are connected together and to the transmission line 23 which is connected to the line 24 by the receiver loading.

Assuming that all of the switches 17 and 18 are closed so as to create the maximum opportunity for back circuits, the circuit operates as follows:

When the coil 14*a* produces its bi-polar pulse, the postive component thereof will be passed by the forwardly connected diode 15*a* and blocked by the reversely connected diode 16*a*. The positive pulse will, therefore, appear at the terminal 19*e* (switch 17*a* being closed) of the PNP transistor 19 to cause a current flow from emitter to base thus raising the potential of the base 19*b* to a potential level above that of the line 24 by the potential drop across the resistor 21. With the emitter to base junction thus forwardly biased, current will also flow across the collector to base junction and through a receiver load to line 24, thus raising the potential of the line 23 above that of line 24 to reproduce the input pulse from the diode 15*a*. Resistor 21 is normally chosen such that for a given load at the collector, the transistor goes into saturation.

With the transmission line 23 raised above the potential of line 24 by the conduction of the transistor 19 the collector 20*c* of the transistor 20 will similarly be potentialized. The base 20*b* will be at the potential of line 24, as substantially no current flows in resistor 22. The emitter 20*e* is also at substantially the potential of line 24 (or slightly positive). This relative potential status in the transistor 20 cuts off the transistor 20, to prevent conduction thereof, and thus isolates all of diodes 16*a*, 16*b*, and 16*h* from providing a ready return path for the positive pulse produced on the output line 23. The diodes 15*b* and 15*g* cannot provide a return path for the positive pulse generated by the coil 14*a*, as these diodes are connected for conduction in opposition to a current of this direction.

When the negative portion of the bi-polar signal is produced at the coil 14*a*, it is passed by the diode 16*a* and blocked by diode 15*a*. With the switch 18*a* closed, the negative going voltage appears at the emitter 30*e* of transistor 20 to induce a base to emitter current flow across the NPN junction to potentialize the base 20*b* below the line 24 by an amount equal to the potential drop across resistor 22. With the emitter to base junction thus forwardly biased, a base to collector current will be induced to flow through the receiver load to line 24, thus changing the potential of the output line 23 to a value below line 24 to reproduce the sense of the input pulse from diode 16*a*.

Just as the positive pulse was isolated from the remaining circuits by the transistor 20, so also will the negative pulse be isolated from the remaining circuits by the transistor 19. When the line 23 goes negative, the collector 19*c* of transistor 19 will follow. With no current flow through resistor 21, the base will be at line 24 potential. So also with the diode 15*a* blocking the negative pulse the emitter 19*e*, will be at line 24 potential (or slightly negative). The transistor 19 will be biased to cutoff and will not conduct. The coils 14*b* and 14*g* (and any others similarly in circuit) will thus be isolated.

When the coils 14*b* and 14*g* (and any intervening coils) produce their bi-polar pulses in turn the same action just described will re-occur. The transmission line 23, will, therefore, experience a succession of bi-polar pulses spaced in time in accordance with the spacing of the transducers 12 in FIG. 1 and having a repetition rate dependent upon the speed of rotation of the magnet 11. The switches 17 and 18 provide the selective control over which of the positive and negative pulses in the succession are to be transmitted to provide the requisite data significance. If all of the switches 17 are closed and selective ones of the switches 18 closed, then the positive pulses can serve as clocking pulses to give hierarchical data significance to those negative pulses that are transmitted by the selective closure of the switches in the series 18*a* to 18*g*. The signal void produced by the omission of one transducer provides the requisite index or start of the succession of pulses. With the switching arrangement shown all combinations may be achieved, although in actual practice the total gamut of combinations would not be employed for any one application. Thus, some of the connections, might, for example, be pluggable or permanently wired.

A final embodiment for segregating the bi-polar signals from a plurality of sources and recombining them is shown in FIG. 3. Here the diodes are replaced with separate transistors of opposite conductivity type in each leg of each of the signal winding circuit. Again, the signal windings 14*a*, 14*b*, and 14*g* are the same as those employed in the prior embodiments and the switches 17*a*, 18*a*, 17*b*, 18*b*, 17*g*, and 18*g* serve the same function of selectively connecting the positive and negative portions of the bi-polar signals to the transmission line 23 to provide the necessary data significance to the presence or absence of the positive and negative pulses in the sequence.

Assuming again for purposes of examining the isolation function of the opposite conductivity-type transistors that all of the switches 17 and 18 are closed, then the circuit will respond to the first occurring bi-polar pulse from the signal winding as follows:

The positive portion of the bi-polar pulse will appear at the emitter 50*e* of the PNP conductivity-type transistor 50. This positive potential will cause an emitter to base current to flow, raising the potential of the base 50*b* above ground potential by the potential drop across the resistor 93, and the transistor 50 conducts in saturation. With this base current flowing, the base to collector junction becomes forward biased and a current flows from the base to the collector through the resistor 70 to the line 23 and through the load resistor at the receiver and back to the common line 24. Thus, both the emitter and the collector are positive with respect to the base when the transistor 50 is operating in saturation. The resistor 70 is relatively small, so that the potential drop thereacross is in the order of a few tenths of a volt, so that the collector voltage on the remaining transistors is less than the voltage across the common base resistor 93.

The transistor 60, although it receives the same positive pulse, will not conduct as both the emitter and the collector junctions are back-biased. The base 60*b*, remains close to the potential of common line 24, as little back current flows out of the base into the resistor 94. So, too, is the NP junction from collector 60*c* to base 60*b* back biased by virtue of the potential rise of the line 23 and the lack of current flow in the resistor 80. The transistor 60 is thus doubly back biased and cannot conduct.

The transistors 51 and 52 both have their bases connected to the common base resistor 93 across which a potential drop is developed by the conduction of the transistor 50 and the bases 51*b* and 52*b* will rise in potential along with the base 50*b* of the conducting transistor 50. The emitters 51*e* and 52*e* of the transistors 51 and 52 will remain at the potential of line 24, as the windings 14*b* and 14*h* are not developing any potential at this time. The collectors 51*c* and 52*c*, with no current flow in the resistors 71 and 72, are raised to the positive potential of the line 23, which is somewhat less positive than the collector 50c of transistor 50, by the voltage drop across resistor 70. Thus, the transistors 51 and 52 will both be back biased across both their emitter to base and their collector to base junctions and will not conduct. These isolate the coils 14b and 14g from the positive signal on the line 23.

The positive signal on the line 23 is further prevented from returning to the common line 24 through the transistors 61 and 62. Both of these transistors have common line 24 potential on their emitters 61e and 62e, as the coils 14b and 14g are not at this time influenced by the magnet 11 to produce any current flow. The bases 52b and 62b are also at line 24 potential, because of the lack of current flow in the resistor 94. The collectors 52c and 62c are raised to the positive potential of the line 23, since no current flows in the resistors 81 or 82. The NP collector to base junctions of both transistors 61 and 62 are positively, or back-biased, to prevent conduction of the transistors 61 and 62.

The negative polarity pulse 60 from the winding 14a causes the transistor 60 to conduct in saturation, with current flow from line 24 through resistor 94 and the base to emitter junction, the switch 18a (now closed), the coil 14a, and back to the common line 24. This saturation lowers the potential of the base 60b below the potential of line 24 by the drop across resistor 94. Since the emitter to base junction is forwardly biased, current will flow across the collector to base junction. The transistor 60 is thus forwardly biased as to both junctions and conducts to produce the negative-going output pulse on the line 23.

Since the line 23 undergoes a negative voltage excursion, the PN collector to base junctions of the transistors 51 and 52 will be back biased. Since they have no forward bias on their emitter to base junctions (coils 14b and 14g produce no voltage of this time), these transistors will not conduct. The collectors 61c and 62c will undergo a negative potential excursion by virtue of being connected to line 23. So also will the bases 61b and 62b undergo a negative potential excursion. However, since no current flows in the resistors 81 and 82, the collectors will undergo a less radical negative voltage excursion than will the bases and the collector to base NP junctions will, therefore, be positively, or back biased. Since the emitter to base junctions are also back biased (emitter at line 24 level, base below the level of line 24), the transistors 61 and 62 will be cut off to prevent a return circuit through the coils 14b and 14h to the common line 24.

When the magnet 11 passes the coils 14b and 14g in turn, the action just traced will be repeated, assuming of course, the switches 19b, 18b, 17g, and 18g are closed. These switches, as in the other embodiments, are selectively closed to provide the control over the positive and negative pulses transmitted to the line 23 to give the proper data significance thereto. As in the previous embodiment, the closure of these switches is a matter of code selection and forms no part of the invention hereinabove described.

The circuits above described have the capability of separating a succession of bi-polar pulses from a plurality of sources into their positive and negative components for codal switching of the individual segregated pulses, and then combining the pulses on a common transmission line, with complete isolation of the signal sources from one another.

While the invention has been particularly shown and described with reference to preferred embodiments thereof, it will be understood by those skilled in the art that various changes in form and details may be made therein without departing from the spirit and scope of the invention.

What is claimed is:

1. In a data transmitting apparatus for selectively transmitting a succession of positive and negative pulses on a common transmission line the combination of:

(a) a plurality of sequentially operative signal generators each adapted in turn to produce a bi-polar electrical signal;

(b) means for segregating each respective bi-polar signal into its positive and negative component pulses;

(c) selecting means for selecting predetermined ones of said segregated positive and negative pulses for transmission on said transmission line;

(d) and means connected to said transmission line and to said selecting means and operative responsive solely to the energy content of said segregated positive and negative pulses for recombining said pulses for transmission on said line.

2. A data transmission apparatus comprising:

(a) a plurality of sequentially operating signal generators each connected to a common line and adapted in turn to produce a bi-polar signal with respect to the common line;

(b) a forward and a reverse unidirectional current conducting device connected to each of said signal generators for segregating the bi-polar signals produced thereby into their positive and negative pulse components;

(c) a selectively actuable switch connected to each of said unidirectional current conducting devices for selecting the positive and negative pulses for transmission;

(d) a semiconducting device of a first conductivity type having an emitter region, a base region, and a collector region, and having its emitter region connected to all of the switches in circuit with the forward conducting unidirectional current conducting devices;

(e) a semiconducting device of a second conductivity type having an emitter region, a base region, and a collector region, and having its emitter region connected to all of the switches in circuit with the reverse conducting unidirectional current conducting devices;

(f) a transmission line connected to the collector regions of both said semiconductor devices, (g) and a resistive connection to the common line for each of said base regions of both said semiconducting devices.

3. A data transmission apparatus comprising:

(a) a plurality of sequentially operating signal generators each connected to a common return and adapted in turn to produce a bi-polar signal with respect to ground;

(b) a forward and a reversely connected unidirectional current conducting device connected to each of said signal generators for segregating the bi-polar signals produced thereby into their positive and negative pulse components;

(c) a selectively actuable switch connected to each of said unidirectional current conducting devices for selecting the positive and negative pulses for transmission;

(d) a semiconducting device of a first conductivity type having an emitter region, a base region, and a collector region, and having its emitter region connected to all of the switches in circuit with the forward conducting unidirectional current conducting devices;

(e) a semiconducting device of a second conductivity type having an emitter region, a base region, and a collector region, and having its emitter region connected to all of the switches in circuit with the reversely connected unidirectional current conducting devices;

(f) a transmission line connected to the collector regions of both said semiconductor devices;

(g) and a resistive connection to a common return line for each of said base regions of both said semiconducting devices;

(h) the said signal generators being the sole potential source for effecting the operation of said semiconducting devices.

4. A data transmitting apparatus comprising:

(a) a plurality of sequentially operating signal generators operative to produce a succession of alternately occurring positive and negative electrical impulses, each on a separate line;

(b) a transmission line;

(c) a first instrumentality connected to said transmission line and to all of the lines producing said positive pulses, and operative responsive solely to the energy content of said positive pulses for producing positive output pulses on said transmission line;

(d) a second instrumentality connected to said transmission line and to all of the lines producing said negative electrical impulses, and operative responsive solely to the energy content of said negative pulses for producing negative output pulses on said transmission line;

(e) means responsive to the operation of said first instrumentality for rendering said second instrumentality inoperative;

(f) and means responsive to the operation of said second instrumentality for rendering said second instrumentality inoperative, (g) and switching means serially connected between each of said lines and said first and second instrumentalities for selecting said positive and negative impulses for action.

5. A data transmitter comprising:

(a) a plurality of magnetic members spaced around the circumference of a circle each having a signal winding thereon operative responsive to a flux change in said member to produce an electrical current in said winding;

(b) a permanent magnet rotating at constant angular velocity past said magnetic members to induce therein a flux change and a consequent current flow in said signal windings;

(c) means connecting one terminal of said signal winding to a common return line;

(d) a forwardly connected diode and a reversely connected diode connected to each of the remaining terminals of said signal windings;

(e) a switch connected to each of said diodes;

(f) a first common connection to the switches connected to said forwardly connected diodes;

(g) a second common connection to the switches connected to said reversely connected diodes;

(h) a transmission line;

(i) a PNP conductivity type semiconducting device having a base, an emitter, and a collector region, and having its base connected to the common return line through a resistor, its collector connected to said transmission line, and its emitter connected to said first common connection;

(j) an NPN conductivity type semiconducting device having a base, an emitter, and a collector region, and having its base connected to the common return line through a resistor, its collector connected to said transmission line, and its emitter connected to said second common connection;

(k) the current flow in said signal windings being the sole source of potential for the operation of said semiconducting devices.

6. A data transmitter comprising:

(a) a plurality of magnetic members spaced around the circumference of a circle each having a signal winding thereon operative responsive to a flux change in said member to produce an electrical current in said winding;

(b) a permanent magnet rotating at constant angular velocity past said magnetic members to induce therein a flux change and a consequent current flow in said signal windings;

(c) means connecting one terminal of said signal winding to a common return line;

(d) a forwardly connected diode and a reversely connected diode connected to each of the remaining terminals of said signal windings;

(e) a switch connected to each of said diodes;

(f) a first common connection to the switches connected to said forwardly connected diodes;

(g) a second common connection to the switches connected to said reversely connected diodes;

(h) a PNP conductivity type semiconducting device having a base, an emitter, and a collector region, and having its base connected to the common return line through a resistor, its collector connected to said transmission line, and its emitter connected to said first common connection;

(i) an NPN conductivity type semiconducting device having a base, an emitter, and a collector region, and having its emitter connected directly to said transmission line and to the common return line through a resistor, its base connected to its collector through a resistor, and its collector connected to said first common connection;

(j) a PNP conductivity type semiconducting device having a base, an emitter, and a collector region, and having its emitter connected directly to said transmission line and to the common return line through a resistor, its base connected to its collector through a resistor, and its collector connected to said second common connection;

(k) the current flow in said signal windings being the sole source of potential for the operation of said semiconducting devices.

References Cited in the file of this patent

UNITED STATES PATENTS 2,817,079 Young ---------------- Dec. 17, 1957

OTHER REFERENCES

"Instruments, AEC Research & Development Report," Inductively Coupled Scanning Switch by F. P. Caiati, August 1959, DP–401, page 8.